(12) United States Patent
Hamm et al.

(10) Patent No.: US 7,618,062 B2
(45) Date of Patent: Nov. 17, 2009

(54) THREE POINT HITCH BALLAST ASSEMBLY FOR WORKING MACHINE

(75) Inventors: Nicholas Hamm, Vineland (CA); Peter Sutherland Sharpe, Ancaster (CA)

(73) Assignee: Deere & Company, Moline, IL (US)

( * ) Notice: Subject to any disclaimer, the term of this patent is extended or adjusted under 35 U.S.C. 154(b) by 336 days.

(21) Appl. No.: 11/633,289

(22) Filed: Dec. 4, 2006

(65) Prior Publication Data

US 2008/0129028 A1 Jun. 5, 2008

(51) Int. Cl.
*B60S 9/00* (2006.01)
*B60S 9/22* (2006.01)

(52) U.S. Cl. .................. 280/759; 414/719
(58) Field of Classification Search ........... 280/759; 414/719, 703
See application file for complete search history.

(56) References Cited

U.S. PATENT DOCUMENTS

| | | | | |
|---|---|---|---|---|
| 3,135,404 A | * | 6/1964 | Pilch | 414/719 |
| 3,492,019 A | * | 1/1970 | Folkerts | 280/759 |
| 3,991,891 A | * | 11/1976 | Cox | 414/719 |
| 4,072,324 A | * | 2/1978 | Griffith | 280/759 |
| 4,518,047 A | * | 5/1985 | Peterson et al. | 172/611 |
| 4,659,102 A | * | 4/1987 | Stuhrmann et al. | 280/481 |
| 4,664,404 A | | 5/1987 | Schultz | |
| 4,971,356 A | * | 11/1990 | Cook | 280/759 |
| 5,141,195 A | * | 8/1992 | Toda et al. | 248/364 |
| 5,498,101 A | * | 3/1996 | Braverman | 404/6 |
| 5,690,359 A | * | 11/1997 | Teich | 280/759 |
| 5,941,565 A | * | 8/1999 | Clendenin, Jr. | 280/759 |
| 6,047,791 A | * | 4/2000 | Hoebelheinrich | 187/222 |
| 6,209,898 B1 | * | 4/2001 | Fortier et al. | 280/187 |
| 6,296,436 B1 | * | 10/2001 | Ramun | 414/719 |
| 6,533,319 B1 | * | 3/2003 | Denby et al. | 280/759 |
| 6,863,468 B2 | * | 3/2005 | Davis et al. | 404/6 |
| 6,988,560 B2 | * | 1/2006 | Bay | 172/272 |
| 7,351,008 B2 | * | 4/2008 | Yodock et al. | 405/71 |
| 7,354,066 B2 | * | 4/2008 | Yamamoto | 280/759 |

FOREIGN PATENT DOCUMENTS

EP 357972 A1 * 3/1990

* cited by examiner

*Primary Examiner*—Paul N Dickson
*Assistant Examiner*—Nicole Verley

(57) ABSTRACT

A working machine includes a rear mounted 3 point hitch and a ballast assembly. The ballast assembly includes a housing and a metal frame positioned within the housing. The frame includes a 3 point coupler connected with the 3 point hitch. Concrete ballast is within the housing in contact with the frame.

23 Claims, 3 Drawing Sheets

THREE POINT HITCH BALLAST ASSEMBLY FOR WORKING MACHINE

FIELD OF THE INVENTION

The present invention relates to working machines such as agricultural tractors, and, more particularly to ballast for such working machines.

BACKGROUND OF THE INVENTION

A working vehicle such as an agricultural tractor may be used as a source of tractive power and/or power take-off (PTO) power, depending upon the application. In the case of a tractor configured as a front end loader, a bucket or other attachment is used to push or lift various objects. Ballast at the rear of the tractor is recommended for more stable and productive use of the front end loader.

One type of ballast is in the form of wheel weights which are attached to the rear wheels, typically radially within the wheel rim. Another type of ballast is fluid, such as calcium chloride or other suitable fluid, which is injected into the inner tubes within the rear tires. A further type of ballast is a ballast assembly which is carried by a pair of lower lift arms on a 3 point hitch assembly at the rear of the tractor. Examples of such ballast assemblies are disclosed in U.S. Pat. No. 6,533,319 (Denby et al.) and U.S. Pat. No. 4,664,404 (Schultz), which are each assigned to the assignee of the present invention and incorporated herein by reference.

Although advantageous for counter-balancing a load on a front end loader of a tractor, a ballast assembly as described above which is carried by the lower lift arms of a 3 point hitch assembly may interfere with use of the drawbar and/or PTO shaft at the rear of the tractor.

What is needed in the art is a ballast which effectively counter-balances a load on a front end loader of a tractor, while at the same time not interfering with use of the drawbar and/or PTO shaft at the rear of the tractor.

SUMMARY OF THE INVENTION

The invention comprises, in one form thereof, a ballast assembly for a working machine including a housing and a metal frame positioned within the housing. The frame includes a 3 point coupler extending from the housing. Concrete ballast is within the housing in contact with the frame.

The invention comprises, in another form thereof, a working machine including a rear mounted 3 point hitch and a ballast assembly. The ballast assembly includes a housing and a metal frame positioned within the housing. The frame includes a 3 point coupler connected with the 3 point hitch. Concrete ballast is within the housing in contact with the frame.

DETAILED DESCRIPTION OF THE INVENTION

Figure 1:
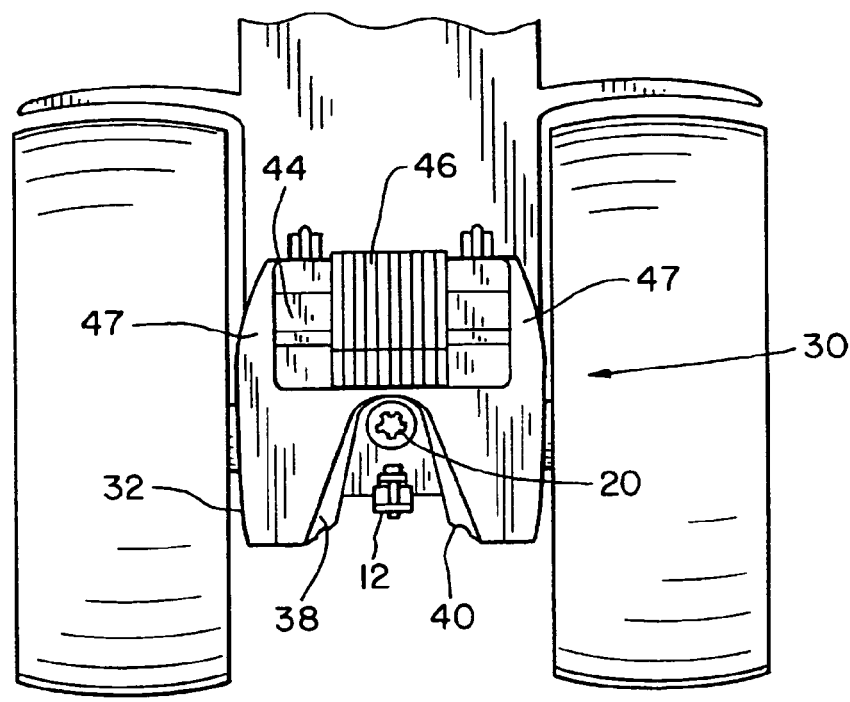
FIG. 1 is a rear, fragmentary view of a tractor including an embodiment of a ballast assembly of the present invention.
Figure 2:
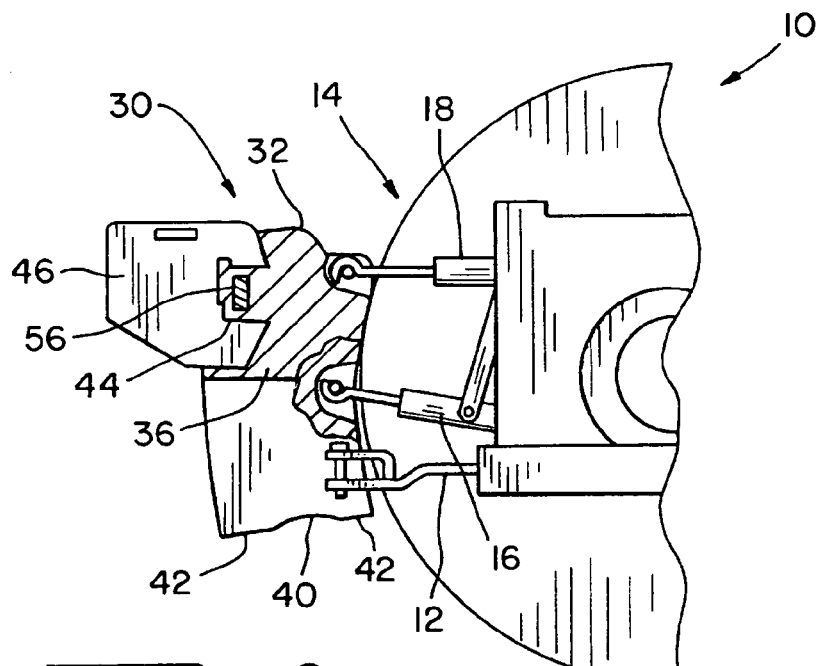
FIG. 2 is side, sectional view of the ballast assembly shown in FIG. 1.
Figure 3:
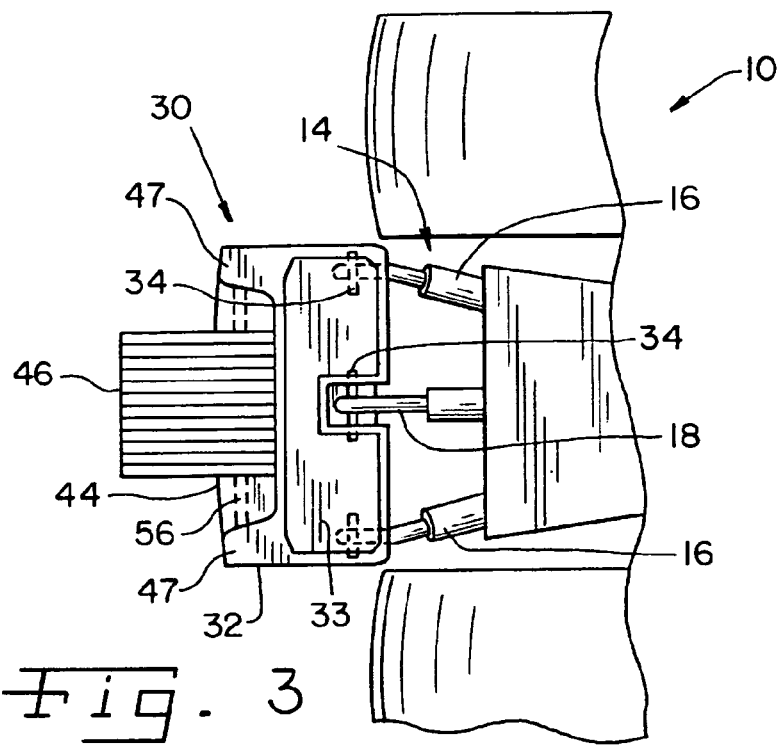
FIG. 3 is a top view of the ballast assembly shown in FIGS. 1 and 2.

Referring now to the drawings, and more particularly to FIGS. 1-3, there is shown a working machine 10, such as an agricultural tractor, which may be wheel driven as shown, or may be track driven, depending upon the application. Working machine 10 may be used as a source of tractive and/or PTO power. To that end, working machine 10 includes a rear mounted drawbar 12 and a rear mounted 3 point hitch 14. Drawbar 12 is used for pulling pull-type implements, such as a wagon, trailer, disk, field cultivator, finish drag, etc. The 3 point hitch 14 includes a pair of lower lift arms 16 and a top link 18. Lower lift arms 16 and top link 18 are respectively connected to a 3 point coupler on a 3 point mounted implement, such as a rotary mower, row crop cultivator, chisel plow or semi-mounted moldboard plow. The 3 point hitch 14 may be directly coupled with the 3 point mounted implement, or may be indirectly coupled to the 3 point mounted implement by way of a 3 point quick coupler (not shown), or may be configured as a 3 point hitch with hooked ends for coupling with the 3 point mounted implement.

Working machine 10 also includes a PTO shaft 20 which is typically located above drawbar 12 and between lower lift arms 16. PTO shaft 20 is typically configured as a 540 rpm or 1000 rpm PTO shaft, depending upon the application. PTO shaft 20 can be used to provide PTO power to either a pull type implement or a 3 point mounted implement, such as a bush hog, manure spreader, silage chopper, etc.

According to an aspect of the present invention, a ballast assembly 30 (FIGS. 1-5) is mounted at the rear of working machine 10 to provide increased ballast, such as may be desirable when using a front end loader (not shown). Ballast assembly 30 generally includes a housing 32, metal frame 34 positioned within housing 32, and concrete ballast 36 within housing 32.

Housing 32 is preferably formed as a roto-molded plastic housing, but could also be formed as a lightweight fiberglass or metal housing which is ultimately filled with concrete ballast, as will be described below. Preferably only housing 32 and frame 34 are shipped to the end dealer location, and the concrete ballast 36 is installed within housing 32 at the end dealer location. This allows the shipping weight to be reduced and the shipping cost to be minimized. Of course, it is also possible to insert concrete ballast 36 within housing 32 at the original point of manufacture, but shipping costs would be higher.

Housing 32 includes a top access cover 33 through which concrete ballast 36 and frame 34 may be inserted. The particular shape and configuration of access cover 33 may vary.

Figure 4:
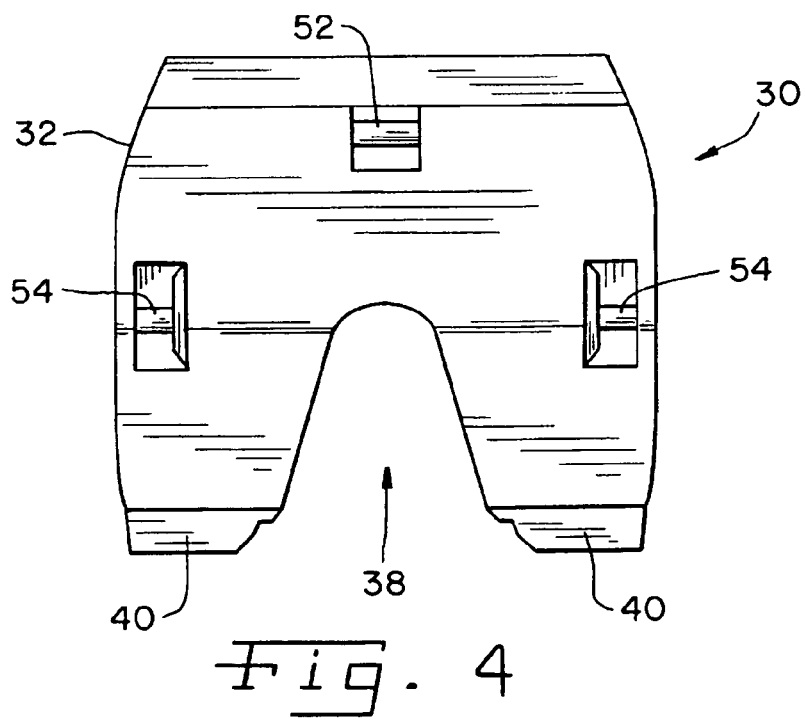
FIG. 4 is a plan view of the ballast assembly shown in FIGS. 1-3.

Housing 32 includes a bottom clearance notch 38 for accommodating drawbar 12 and/or PTO shaft 20 (FIGS. 1 and 4). Bottom clearance notch 38 has an inverted generally V-shape, but could also have a U-shape, rectangular shape, etc. Notch 38 is also shaped to widen toward the rear of ballast assembly 30, thereby accommodating angular movement of a PTO shaft and/or hitch tongue of an attached implement. The particular shape of notch 38 can thus vary.

Ballast assembly 30 is preferably raised to the upper-most position with 3 point hitch 14, as shown in FIGS. 1-3, when using drawbar 12 and/or PTO shaft 20. However, it will be appreciated that uneven ground terrain or turning of working machine 10 causes relative angular movement of the hitch tongue and/or PTO shaft of an attached pull-type implement.

Housing 32 includes a bottom surface 40 on either side of bottom clearance notch 38 allowing ballast assembly 30 to be placed on a ground surface and uncoupled from 3 point hitch 14. Bottom surface 40 on either side of bottom clearance notch 38 includes four projections 42 at the lower outside corners allowing ballast assembly 30 to be placed on an uneven surface.

Housing 32 also includes a mounting rail 44 at an upper rear corner region thereof which is configured to accommodate additional weights for increased ballast. In the embodiment shown, mounting rail 44 is configured so as to define an upwardly opening hook for being received in a complimentary shaped opening provided in a front side of a suitcase weight, with the length of the rail 44 being sufficient to accommodate one or more side-by-side suitcase weights 46 which are typically mounted at the front end of work machine 10. Mounting rail 44 could also possibly be configured to accommodate different types of additional weights, such as wheel weight segments, etc. A lateral retaining feature 47 at either end of mounting rail 44 prevents excessive lateral movement of suitcase weights 46. Suitable clearance is provided between suitcase weights 46 and mounting rail 44 to allow suitcase weights 46 to be hung and rotated into place.

Figure 5:
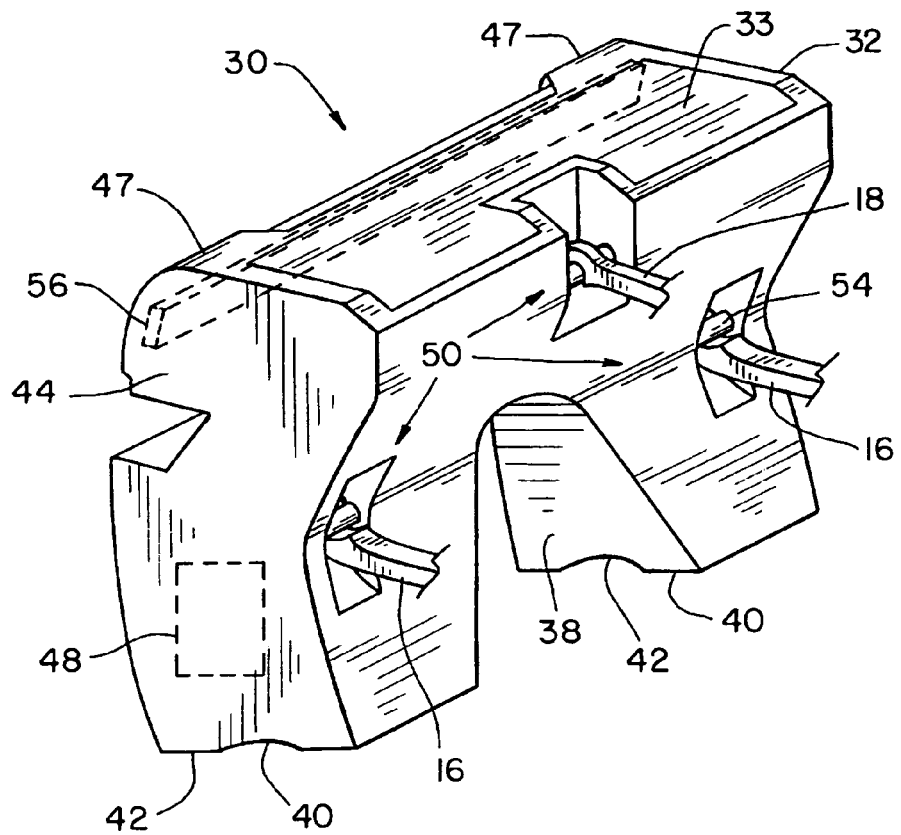
FIG. 5 is a perspective view of the ballast assembly shown in FIGS. 1-4.

Housing 32 may also optionally be configured with one or more storage compartments 48 for storage of tools, etc (shown in phantom lines in FIG. 5). Of course, it will be appreciated that the provision of a storage compartment 48 reduces the overall weight of concrete ballast 36 within housing 32, and therefore the additional utility of a storage compartment versus the additional ballast weight should be considered.

Frame 34 includes a 3 point coupler 50, comprising a plurality of coupler elements comprising a top link coupler 52 and a pair of 3 point arm couplers 54 (FIGS. 4 and 5). Each of the couplers 52 and 54 is here shown as a horizontal rod, with the housing 32 including an upper front corner provided with a recess located centrally between opposite sides of the housing and containing the rod defining the top link coupler 52, and with the rods defining the arm couplers 54 being disposed at approximately an even height with the top of the clearance notch 38 and contained within respective, forwardly opening recesses located in the housing 32 adjacent opposite sides of the housing. Frame 34 provides a dual functionality of allowing coupling with 3 point coupler 50, as well as reinforcing concrete ballast 36 within housing 32. The shape and size of frame 34 beyond 3 point coupler 30 can vary depending upon the desired extent of reinforcement of concrete ballast 36.

Top link coupler 52 and 3 point arm couplers 54 extend through corresponding openings (not numbered) in housing 32 for respective coupling with top link 18 and lower lift arms 16 of 3 point hitch 14. It will be appreciated that 3 point hitch 14 cannot be coupled with a 3 point mounted implement when it is couple with ballast assembly 30.

Frame 34 also includes an optional steel bar 56 which is inserted into housing 32 prior to filling with concrete ballast 36. Steel bar 56 can be part of a multi-part frame 34, as shown in FIGS. 1-5, or can be an integral part of a unitary frame. Steel bar 56 assists in supporting suitcase weights 46 on mounting rail 44. In the event steel bar 56 is separate from the remainder of frame 34, then steel bar 56 is preferably supported on the inside of housing 32 by suitable support structure prior to filling housing 32 with concrete. For example, housing 32 can be formed with two inside walls, each having an opening for receiving and supporting opposite ends of steel bar 56.

During manufacture, housing 32 is formed as a roto-molded hollow plastic part. Frame 34 is positioned within housing 32 to reduce shipping space, and ballast assembly 30 is shipped preferably without concrete ballast 36. At the end dealer location, frame 34 is positioned such that 3 point coupler 50 extends through the corresponding openings in housing 32, and concrete ballast 36 is installed within housing 32. After hardening of the concrete, ballast assembly 30 is ready for mounting to 3 point hitch 14 of working machine 10. When not in use, ballast assembly 30 is simply placed on a desired surface and 3 point hitch 14 is uncoupled from 3 point coupler 50.

Figure 6:
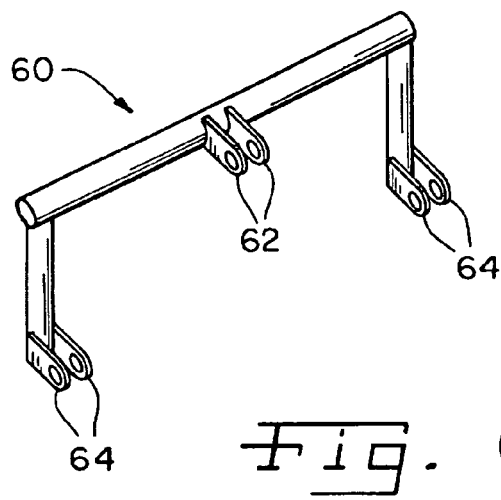
FIG. 6 is a perspective view of another embodiment of a frame which can be used with the ballast assembly of the present invention.

In the embodiment of ballast assembly 30 shown in FIGS. 1-5 and described above, frame 34 is a multi-piece frame basically including 3 separate rods which are received within respective recesses in housing 32 and held in place with concrete ballast 36. However, it is also possible to form the frame as a unitary frame. For example, referring to FIG. 6, a frame 60 includes a top member and two connected side members. A pair of flanges 62 define a top link coupler, and two pairs of flanges 64 define lower lift arm couplers. Housing 32 of ballast assembly 30 can include openings at the rear of each respective recess through which flanges 62 and 64 extend. If configured in this manner, it may be necessary to modify the shape of housing 32 somewhat to allow use of pins for coupling flanges 62 and 64 with 3 point hitch 14. A unitary frame as shown in FIG. 6 provides additional strength to concrete ballast 36 within housing 32.

Having described the preferred embodiment, it will become apparent that various modifications can be made without departing from the scope of the invention as defined in the accompanying claims.

The invention claimed is:

1. A ballast assembly for a working machine, comprising:
a housing, which, as considered relative to a mounted position on said working machine, includes a forward side provided with an upper recess located centrally between opposite sides of said housing and a pair of lower recesses respectively located adjacent said opposite sides of said housing and spaced below said upper recess;
a metal frame positioned within said housing, said frame including 3 point coupler elements respectively extending from said housing at said upper recess and said pair of lower recesses;
said housing having a bottom defining a downwardly opening clearance notch extending fore-and-aft through said housing and having a top located approximately at a level corresponding to a height of said pair of lower recesses; and
concrete ballast being located within said housing in contact with said frame.

2. The ballast assembly of claim 1, wherein said clearance notch has opposite sides which diverge rearwardly for accommodating side-to-side movement of a trailing implement coupled to at least one of a power take-off shaft and a drawbar of said working machine.

3. The ballast assembly of claim 2, wherein said clearance notch has an inverted generally V-shape.

4. The ballast assembly of claim 1, wherein said housing is comprised of plastic.

5. The ballast assembly of claim 1, wherein said housing includes at least one storage compartment.

6. The ballast assembly of claim 1, wherein said metal frame comprises a steel frame.

7. The ballast assembly of claim 6, wherein said frame comprises one of a multi-piece frame and a unitary frame.

8. The ballast assembly of claim 1, wherein an upper rear corner region of said housing defines a horizontal transverse mounting rail for receiving additional weights.

9. The ballast assembly of claim 8, wherein said mounting rail is configured so as to define an upper surface defining an upwardly opening hook for being received within a complimentary opening provided in a front surface of a suitcase weight.

10. The ballast assembly of claim 8, including a reinforcing steel bar extending horizontally within said mounting rail.

11. The ballast assembly of claim 1, wherein said housing includes a bottom surface with four projections for placement of said ballast assembly on an uneven surface.

12. A working machine, comprising:
a rear mounted 3 point hitch; and
a ballast assembly, including:
  a housing, which, as considered relative to a mounted position on said working machine, includes a forward side provided with an upper recess located centrally between opposite sides of said housing and a pair of lower recesses spaced below and respectively adjacent opposite sides of said housing from said upper recess;
  a metal frame positioned within said housing, said frame including 3 point coupler elements respectively located at said upper recess and said pair of lower recesses and connected with said 3 point hitch;
  said housing having a bottom defining a downwardly opening clearance notch extending fore-and-aft through said housing and having a top located approximately at a level corresponding to a height of said pair of lower recesses; and
  concrete ballast being located within said housing in contact with said frame.

13. The ballast assembly of claim 12, wherein said working machine includes a rearwardly projecting power take-off and a rearwardly projecting drawbar disposed below said power take-off; each said power take-off and drawbar being located in fore-and-aft alignment with said clearance notch and said power take-off being at a height no greater than said top of said clearance notch.

14. The ballast assembly of claim 13, wherein said clearance notch has an inverted generally V-shape.

15. The ballast assembly of claim 12, wherein said housing is comprised of plastic.

16. The ballast assembly of claim 12, wherein said housing includes at least one storage compartment.

17. The ballast assembly of claim 16, wherein said frame comprises one of a multi-piece frame and a unitary frame.

18. The ballast assembly of claim 12, wherein said metal frame comprises a steel frame.

19. The ballast assembly of claim 12, wherein said housing includes an upper rear corner region configured so as to define a horizontal transverse mounting rail adapted for providing a mounting for additional weights.

20. The ballast assembly of claim 19, wherein said mounting rail is configured so as to define an upwardly opening hook for being received within a complimentary opening provided in a forward side of a suitcase weight.

21. The ballast assembly of claim 19, including a reinforcing steel bar extending horizontally within said mounting rail.

22. The ballast assembly of claim 12, wherein said housing includes a bottom surface with four projections for placement of said ballast assembly on an uneven surface.

23. The ballast assembly of claim 12, wherein said 3 point coupler elements include a top link coupler defined by a first rod and a pair of 3 point arm couplers respectively defined by second and third rods.

* * * * *